March 31, 1970   J. DE LA CIERVA   3,503,318
TARGET ACQUISITION SYSTEM FOR HIGH POWER OPTICAL DEVICES
Filed Oct. 6, 1967   3 Sheets-Sheet 2

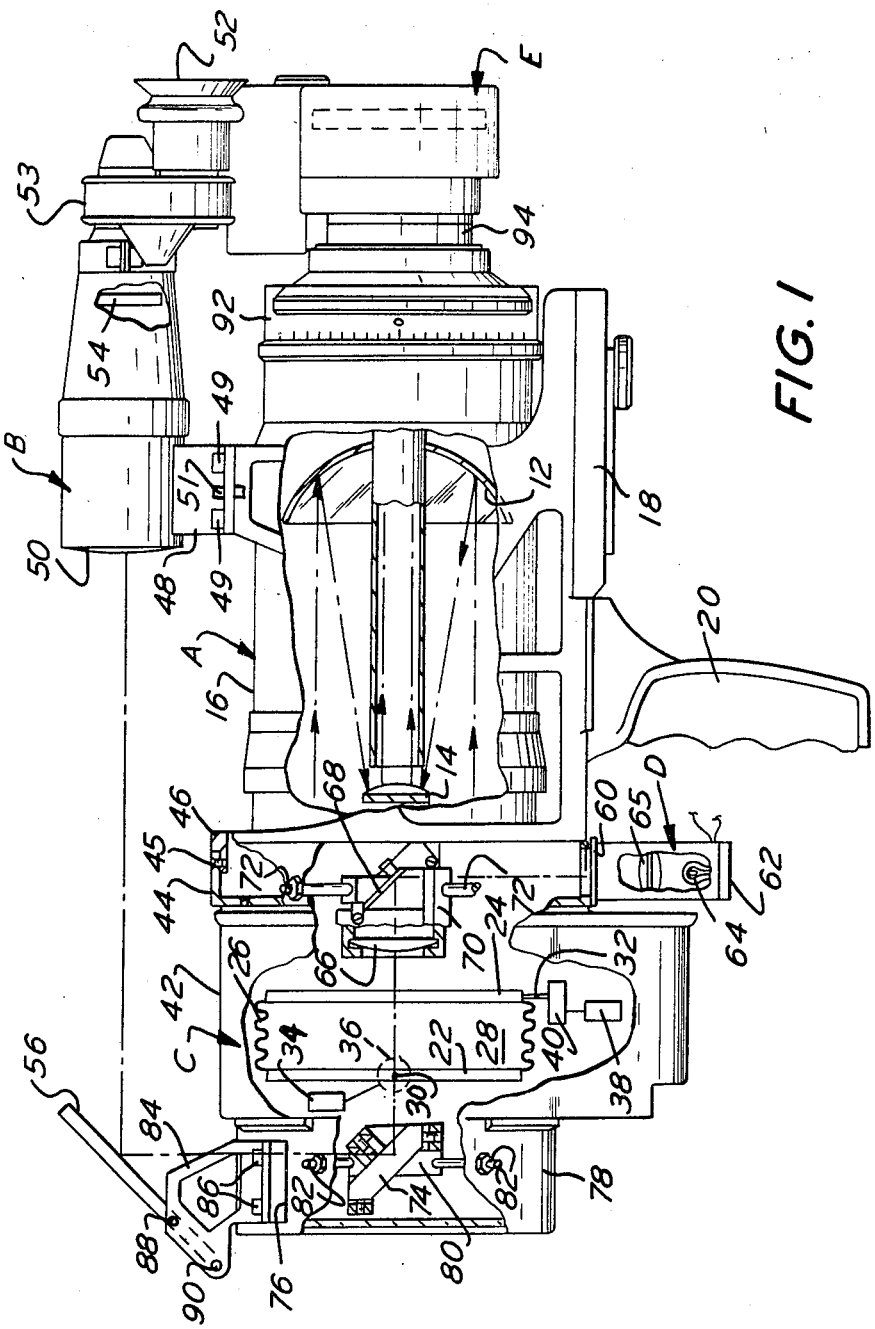

INVENTOR
JUAN De La CIERVA

BY Stanley Bilker
ATTORNEY

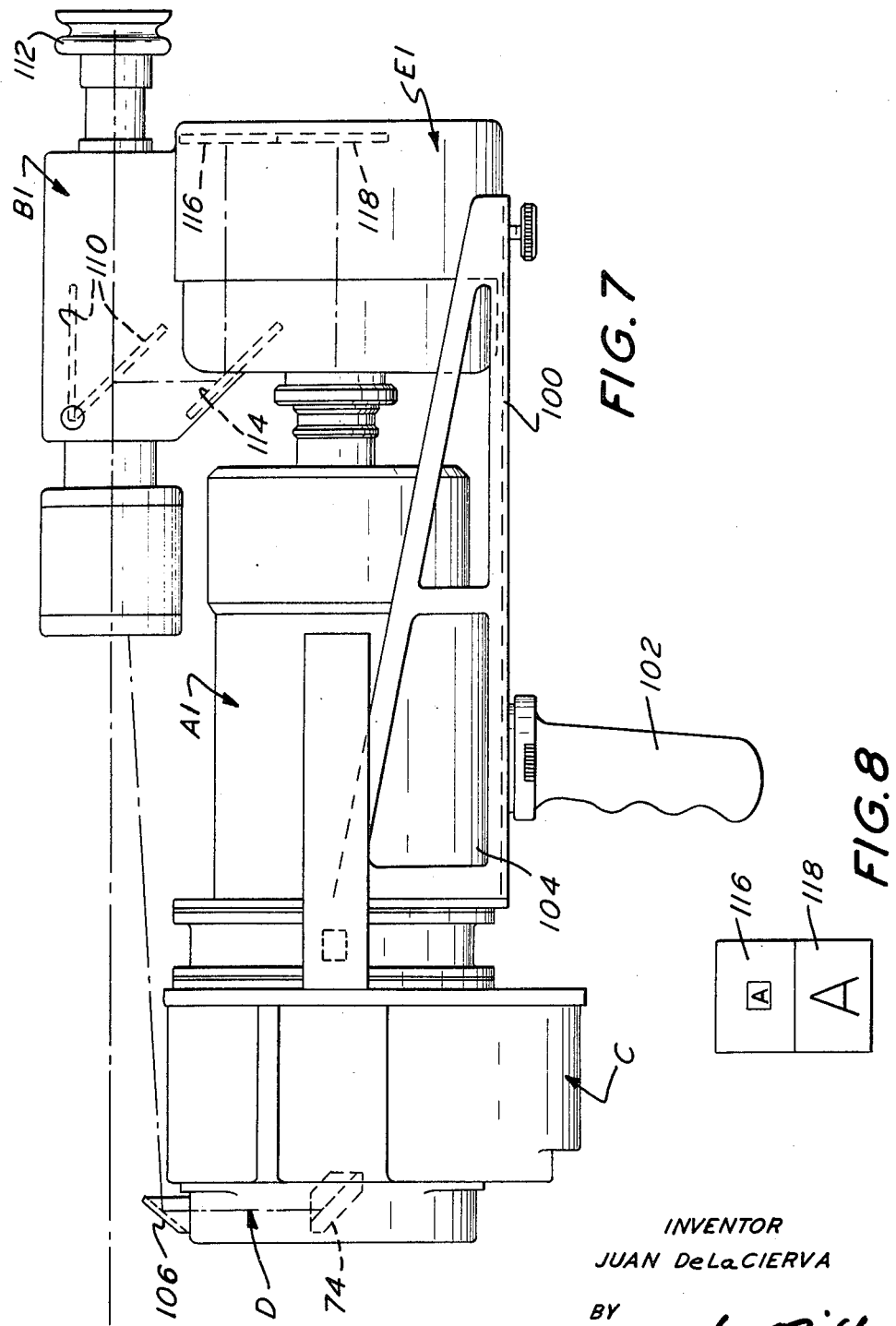

United States Patent Office 3,503,318
Patented Mar. 31, 1970

3,503,318
TARGET ACQUISITION SYSTEM FOR HIGH
POWER OPTICAL DEVICES
Juan de la Cierva, Oreland, Pa., assignor to Dynascience
Corporation, Blue Bell, Pa., a corporation of Pennsylvania
Filed Oct. 6, 1967, Ser. No. 673,430
Int. Cl. G03b 3/10
U.S. Cl. 95—44    10 Claims

ABSTRACT OF THE DISCLOSURE

A target acquisition system comprising a very high power telescope having an attendant narrow field of view coupled with a relatively low power scanning telescope having a much wider field of view. The image produced by the high power Telephoto system is stabilized by a variable-angle fluid wedge which automatically compensates for high frequency angular motion between the Telephoto lens and the target. A reference pattern in collimation with the Telephoto lens and stabilized by the compensator wedge is superimposed upon the low power reticle plane to locate and define the high power field of view therein.

Brief summary of the invention

This invention relates to very high power telescopic or Telephoto observation and tracking systems, and more particularly relates to a target acquisition system for locating and identifying an object under extremely great magnification.

Photography or telescopic observation using very long focal length lenses present most difficult problems because of the narrow field of view offered by any extremely high power objective lens or reflex sight. The small angle of the field of view makes it difficult to locate, acquire or identify a target even when the camera or telescope is pointed in the general direction of the target. The overall complexity can best be illustrated by the situation presented in the telescopic examination or observation of a particular astral body in a galaxy. The narrow field of view of an astronomical telescope allows the observer to see only one or two stars at a time. However, without a wider frame of reference, an astronomer, either professional or amateur, has a most tedious task in just locating the particular star to be studied. This problem is compounded even after location of the target by relative angular motion between the target and the optical system so as to produce image motion at the focal plane of the telescope or Telephoto lens. Focussing presents still another difficulty not only because of the narrow depth of focus associated with long focal length lenses but also because of the increased relative image motion produced by the greater magnification.

Photographs taken through long Telephoto lenses, especially from a non-rigid platform, are severely affected by image motion. While high shutter speeds may generally reduce the total image motion, such high speeds require large aperture fast lenses (low f/number) which are usually much too massive, heavy and expensive for most applications. Also, the faster film which must be employed is grainier and effects a sacrifice in resolution.

It is likewise apparent that hand-held high power telescopic or photographic systems or those mounted in a non-stable environment, such as a moving vehicle or aircraft, would manifest many interrelated problems of target acquisition, image motion, target identification and focussing. The complexities of these problems increases proportionately as the focal length of the optical/photographic system is increased and with the combined dynamics of vehicle/aircraft motion and operator instability.

In my prior U.S. Patent No. 3,212,420, there is shown a variable-geometry liquid prismatic wedge which stabilizes the image at the focal plane when it is placed before a telescope by automatically compensating for relative angular motion between the target and the optical system. The presence of such a fluid prism image motion compensator in front of a Telephoto lens enables the observer to stay on target once the target has been acquired in the field of view of the telescope. By use of the variable-angle compensator, image motion at the film plane is reduced, thereby permitting the use of smaller aperture lenses and lower shutter speeds together with low sensitivity (high grain) film under poorer light conditions.

However, even with the use of the hereinbefore mentioned image motion compensator, the initial acquisition of the target is still most elusive, particularly when attempting to locate and obtain in a short time a target observed visually without the telescope.

It is therefore an object of this invention to provide a target acquisition system for a long focal length telescope or Telephoto lens.

Another object of this invention is to provide a target acquisition system for a telephotographic camera which will permit the simultaneous photographing of the particular target zone together with the area generally surrounding the target position.

Still another object of this invention is to provide a target acquisition system for extremely high power Telephoto lenses in which the highly magnified target area is located and identified with respect to a much wider field area.

Yet another object of this invention is to provide a target acquisition system for Telephoto cameras in which color aberrations are minimized and resolution maximized.

A still further object of this invention is to provide a high power Telephoto system which can be used in land vehicles, water-borne vehicles, aircraft and space vehicles, including helicopters, as well as in hand-held or body-supported modes.

Other objects of this invention are to provide an improved device of the character described, which is easily and economically produced, which is sturdy in construction and highly effective in operation.

Description of the figures

With the above and related objects in view, this invention consists of the details of construction and combination of parts as will be more fully understood from the following detailed description when read in conjunction with the accompanying drawing in which:

FIGURE 1 is a side elevational view and partly in section of a dual telescope observation and target acquisition system embodying this invention.

FIGURE 7 is a side elevational view of a Telephoto system for simultaneously photographing the particular target zone together with the area generally surrounding the target position.

FIGURE 8 is a plan view of the filmed image of the target adjacent that of the surrounding area as seen through the low power scope.

Detailed description

Figure 5:
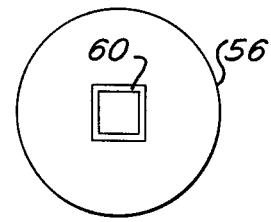
FIGURE 5 is a plan view of the collimating illuminated reticle.

Referring now in greater detail to the drawings in which similar reference characters refer to similar parts, there is shown a Telephoto observation and target acquisition system comprising a high power telescope, generally designated as A, a low power telescope, generally designated as B, a variable-angle fluid wedge assembly C providing image motion compensation for the high power system, and a collimation system D for locating and orienting the greatly magnified image of the high power system with respect to the relatively large field of view of the low power system. A single lens reflex camera E is secured to the viewing end of the high power telescope A.

The high power telescope system A which is illustrated is a 1500 mm. focal length Telephoto reflex lens including a concave primary reflector 12 of generally parabolic configuration and a convex secondary reflector 14 mounted within a generally tubular barrel 16. Of course, the high power system A could also, just as well be a conventional telescope with an objective lens system, the reflex system being shown to demonstrate a folded optics configuration having a relatively large aperture set within a generally compact space. Suitable internal corrector elements, refracting lens elements and filters are employed but not shown since they do not form a part of the invention itself. The high power telescope A is mounted in a bracket 18 and is adapted to be supported in a handheld pistol grip 20.

Figure 3:
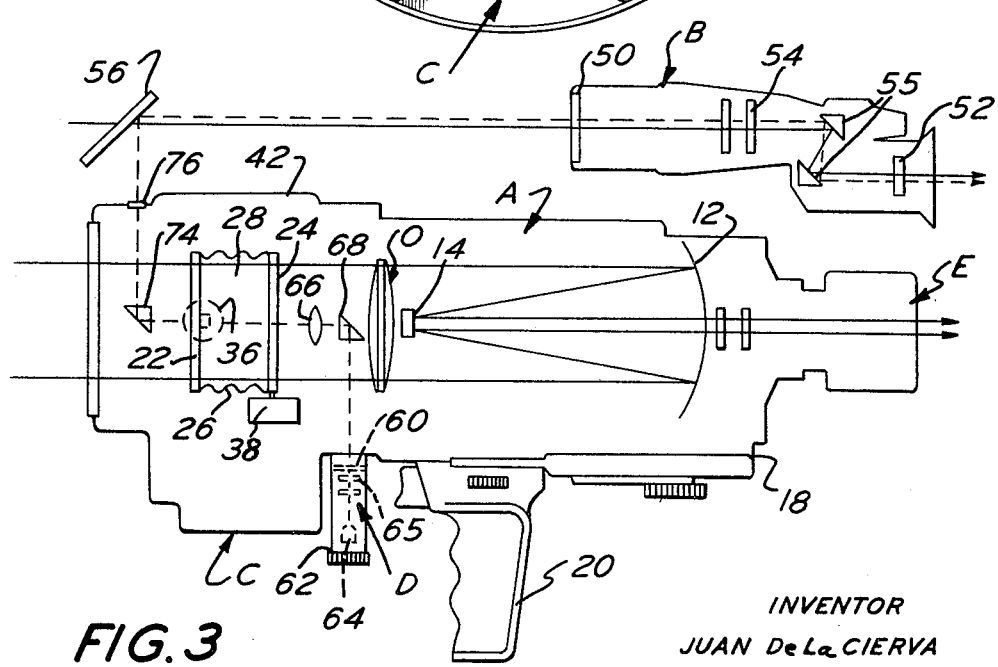
FIGURE 3 is a schematic representation of the optical system.

The image motion compensator C is a variable-geometry fluid wedge substantially identical to that shown in my prior U.S. Patent No. 3,212,420. As best shown in FIGURES 1 and 3, it includes optically flat and transparent front and rear disks 22 and 24 which peripherally support a bellows 26 and encapsulate a liquid volume 28 therebetween. The axis of rotation of the front disk to define a horizontal pivotal axis 30, and the pivotal axis 32 of the rear disk 24 is vertical so that the two axes are mutually perpendicular. Rotation of the front glass 22 about its axis 30 produces an optical deviation of the image in a vertical or elevational plane, and rotation of the rear glass 24 about its vertical axis 32 produces optical deflection of the image in an orthagonally disposed horizontal or azimuthal plane.

The angular movement of disk 22 is controlled by a gyroscope sensor 34 through torque motor 36 while that of disk 24 is governed by gyro 38 operating through torque motor 40. For purpose of simplicity, the details of construction of the motion compensating system are not repeated here but are only illustrated schematically. The image motion compensator is mounted in a cylindrical frame which is detachably secured by flange 44 to the front flange 46 of telescope barrel 16. By sensing the degree of angular motion of the high power telescope A with respect to the target itself and orienting the angle of the disks 22 and 24 in the appropriate compensating direction, the fluid wedge C deflects the path of the light beam and thereby stabilizes the image of the target as seen through the high power system.

It is to be observed that the diameter of the compensator's disks 22 and 24 are slightly greater than the diameter of the parabolic reflector 12 so as not to intrude upon the aperture of the high power telescope A. However, the compensator C does not overlie the field of the low power telescope B, and the latter is not image motion compensated.

Figure 4:
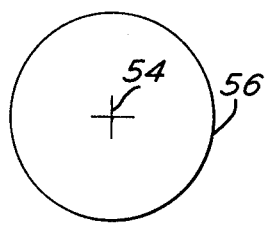
FIGURE 4 is a view of the low power cross-hair reticle as seen through the eyepiece of the low power telescope.
Figure 2:
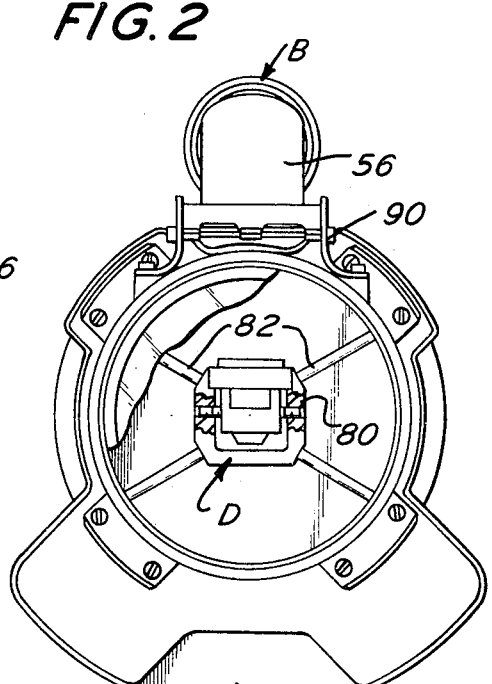
FIGURE 2 is an end view as seen from the left hand side of FIGURE 1.

The low power telescope B is a conventional 3 to 8 power monocular, for example a spotting scope having a 50 mm. objective lens 50. It also includes an eyepiece 52 which is focused upon a black crosshair reticle 54 centrally disposed within circle 56 which defines the low power field of view, as shown in FIGURE 4. The telescope B is secured to the bracket 18 of telescope A by bracket head 48 and mounting screws 49 and 51, these providing means for aligning the bore of the low power scope B with respect to the optical axis of the high power system. The object field of the monocular B is viewed through a half-silvered mirror or beam splitter 56 which is adjustably affixed to the front end of the frame 42 and forms part of the collimation system. The percentage of light which is transmitted and reflected by the beam splitter 56 is approximately equal.

Figure 6:
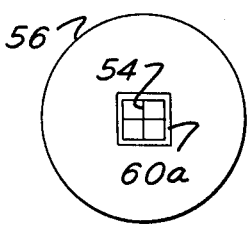
FIGURE 6 is a plan view of the image of the illuminated reticle superimposed on the cross-hair reticle when the target is acquired.

The target acquisition system D directs a collimated reference pattern which is coincident with the image "seen" through Telephoto lens A back through the motion compensator C and superimposes a stabilized reference image upon the low power reticle 54. By seeing the projected reference image through the eyepiece 52 of the low power telescope superimposed upon its reticle 54, as shown in FIGURE 6, there is assurance that the high power telescope is on target and its image aligned. The collimated light beam originates between the motion compensator C and the Telephoto lens A. It consists of a square annular reticle 60 supported in housing 62 and illuminated by a lamp 62 whose rays are condensed by collector lens 65. The reference pattern 60 is projected by objective lens 66 along the optical axis of the Telephoto lens A after reflection by right angle prism 68. The prism 68 is suitably supported in bracket 70 which is centrally mounted within flange 44 by radially extending studs 72. The reference pattern 60 is formed in a slide reticle which is located at the focal plane of the objective lens 66. Accordingly, the reticle itself is located at "infinity" and its image passes as parallel rays through the fluid prism C in a direction exactly opposite to the target rays entering the telescope A. These parallel rays are then reflected vertically by an Amici right angle roof prism through a window 76 in the upper portion of flange 78. The Amici prism 74 also reverts the image by virtue of its roof hypotenuse so that motion of the reticle 60 will appear to move with directional movement corresponding to that of the monocular.

Bracket 80 supports the Amici prism 74 centrally within the flange 78 by means of a plurality of radially extending studs 82. After emerging from the optically flat window 76, the rays of the illuminated reticle pattern 60 are reflected back into the telescope B by the beam splitter mirror 56. The beam splitter mirror is held in an adjustable bracket 84 secured to flange 78 by set screws 86. Loosening of the screws 86 permits rotational adjustment of the bracket 84 so as to orient the image of the reticle 60 in the azimuth direction. Elevational adjustment of the reference image 60 is accomplished by loosening screws 88 and pivotally adjusting the mirror 56 about it hinged axis 90. Since the mirror 56 is a plane parallel glass plate, no deflection of the target seen by the low power telescope will occur in the transmission direction. The image of the reference reticle pattern 60 appears as an illuminated annular square 60a on the focal plane of the monocular B, as shown in FIGURE 5. When the illuminated image 60a is superimposed upon the crosshair 54, as shown in FIGURE 6, the image of the target is aligned in the two telescopes. Collimation and adjustment of the system will now be described.

The optical axes of the Telephoto lens A and the scanning scope B are aligned with respect to each other by a bore sighting procedure. First, the entire head of the compensator C is removed by backing out mounting screws 45 and separating flanges 44 and 46. The Telephoto lens A without the compensator head is mounted on a tripod and set at infinity by appropriate setting of ring dial 92 which spaces the convex lens 14 with respect to concave parabolic lens 12. With single lens reflex camera E secured to the Telephoto bracket 94, a sighting is made of a target to define the field of vision covered by the Telephoto lens. The crosshair reticle 54 is aligned with the camera lens field of vision in azimuth by rotating bracket 48 after loosening set screws 49 and in elevation by turning height adjustment screw 51. That is, the field covered by the Telephoto lens will be a small section of the field seen through the eyepiece 52, and the small field is centered with respect to the crosshair reticle.

Next, the compensator head C is reinstalled and its power turned on. In the stabilized tripod position, the plates 22 and 24 are parallel. The brightness of the lamp 64 is adjusted to produce a suitable image on the focal plane of the low power scope B. The coincidence between the illuminated rectile image 60a and the crosshair 54 with the compensator at plane-parallel "zero" position determines alignment of the camera lens with the illuminated reticle 60. This adjustment is made in azimuth by loosening screws 86 and rotating bracket 84 of the beam splitter mirror 56. In elevation, screws 88 are loosened and the mirror tilted about axis 90. When the images are as shown in FIGURE 6, the two systems are aligned.

As is apparent, both the image of the target viewed by the camera E and the image of the reticle 60 as seen in the eyepiece 52 are both stabilized and always in line with each other since both images pass through the compensator C and are bent by the fluid wedge 28. In order to focus, one can either utilize a prefocussing technique by setting the focus ring 94 on the Telephoto lens A to the estimated target distance or by "through the lens" focusing through the single lens reflex camera E. In the "through the lens" technique, the target image is viewed through the monocular eye lens 52 and focused by rotating focus ring 53. The system is aimed so that the target image appears inside the illuminated reticle image 60a as observed through the monocular eyepiece 52. Next, shift the eye to the single lens reflex sight and focus target image by focussing ring 94 of Telephoto lens A while minimizing color bands.

In order to take a picture, one has the option of using a frame finder technique or "through the lens" technique. The frame finder technique is faster and is most reliable but can only be utilized with targets which do not have high contrast areas. Its first step requires that the target image be first viewed through the monocular eye lens 52. The system is held on target until the illuminated reticle appears—i.e. when the fluid wedge 28 is sufficiently small to place illuminated reticle square 60a in the field of the monocular scope B. No picture should be taken until the illuminated reticle is seen, for there will be too much color in the system resulting from the large deflection wedge angle of the compensator C. This will involve a time period of approximately two seconds. The monocular system is aimed so that the target image appears within the illuminated reticle image 60a. The system is then rapidly manipulated to superimpose the black crosshair reticle 54 on the illuminated reticle 60a and the picture snapped.

The "through the lens" technique permits better focussing and target monitoring but requires areas of high target contrast in addition to being slower. The first steps again involve viewing the target image through the monocular eye lens, holding the system on target until the illuminated reticle appears and aiming the system so that the target image is within illuminated reticle image 60a. However, next the eye is shifted to the single lens reflex sight, and the system rocked in the direction of the "color" spread until the color bands on high contrast areas are removed. When the color bands are gone, the picture is snapped.

In either of the foregoing techniques, the image of the illuminated reticle 60 viewed through the monocular eyelens 52 is stabilized with respect to the target image since it is coincident with the stabilized field of vision "seen" through the fluid prism C by the camera E.

In FIGURE 7, there is shown another embodiment of the invention. A high power telescope A1 to which a camera E1 is attached is held in a bracket 100 having a pistol grip 102. An image compensator head C which utilizes the variable angle liquid wedge is mounted over the front end of the Telephoto housing 104. Again, a collimated light beam assembly D originating at a source located between the high power objective lens and the compensator C directs a reference signal through the liquid element 28 into the Amici roof prism 74. Right angle prism 106 causes the reference beam to traverse a path back into the objective lens of the low power scope B1. In this case, the small sector right angle prism 106 does not mask and overlie the entire field of view of the low power system because the said field is being photographed as well. That is, in the FIGURE 7 embodiment, a portion of the field is actually being photographed through the optics of the low power telescope B1 whereas in the FIGURE 1 embodiment, the field was merely seen by the eye through telescope B. A hinged mirror 110 is pivotally supported within the low power scope B1 in the manner in which a single lens reflex reflector operates from the camera shutter tripping mechanism. In the "off" position, the mirror 110 is horizontal and out of the way so as to permit viewing of the large low power field through ocular 112. The illuminated reference pattern 60a is again superimposed upon the black cross hair reticle 54, as before. Alignment and target acquisition now having been obtained, the camera shutter is now tripped causing the mirror 110 to be instantaneously pivoted downwardly into a 45° position.

Downward actuation of mirror 110, deflects both the illuminated reticle pattern 60a and the entire field of vision of the low power objective vertically against fixed mirror 114 and thereby focussed upon the upper half 116 of the film plane or frame. A square spot on the film outlines the target of the high power system within the upper film half frame 116. Simultaneously, the magnified, stabilized image of the high power telescope A1 is focussed in the lower half of the film in half frame 118. The record available on a processed film will show two lines of pictures, the lower picture providing a stabilized, expanded closeup view of a small illuminated segment of picture directly above it. Thus, it is possible to obtain, simultaneously, records of both a target and the area surrounding it.

Although this invention has been described in considerable detail, such description is intended as being illustrative rather than limiting since the invention may be variously embodied, and the scope of the invention is to be determined as claimed.

What is claimed is:

1. A target acquisition system for high power optical devices comprising:
    a high power telescope having a narrow field of view,
    image motion compensating means constituting a variable-angle fluid prism interposed between the target and said telescope and coupled to the latter so as to stabilize the image of the target,
    a low power telescope having a relatively wide angle field coupled to said high power telescope with respective optical axes in alignment with the target, and
    means constituting a reference pattern reticle superimposed in collimation with the high power telescope and optically transmitted through said image motion compensator means into registration with the focal plane of said low power telescope so as to define and locate therein the high power field of view which is stabilized within the wide angle field of view.

2. The target acquisition system of claim 1 wherein said reference pattern means comprises an illuminated reticle disposed intermediate said image motion compensator means and said high power telescope.

3. The target acquisition system of claim 2 wherein said illuminated reticle is disposed at the focal plane of a collimating objective lens.

4. The target acquisition system of claim 3 wherein said high and low power telescopes are aligned along substantially parallel optical axes.

5. The target acquisition system of claim 2 including a beam-splitter interposed between said low power telescope and the target transmitting the image of the target therethrough and reflecting the image of said illuminated reticle simultaneously into said low power telescope.

6. The target acquisition system of claim 2 including a camera coupled to the receiving end of said high power telescope.

7. The target acquisition system of claim 6 including means to direct the image of the wide angle field of the lowe power telescope upon the film plane of the camera simultaneously with and adjacent to the image of the narrow field of the high power telescope.

8. The target acquisition system of claim 7 wherein the image of the illuminated reticle is projected upon the low power image of the wide angle field to outline therein the image of the narrow angle field.

9. The target acquisition system of claim 1 wherein said reference pattern means comprises a marginal configuration defining the high power field of view.

10. The target acquisition system of claim 9 wherein said reference pattern means is superimposed upon the focal plane of the low power telescope by reflection.

References Cited

UNITED STATES PATENTS

| | | | |
|---|---|---|---|
| 2,409,186 | 10/1946 | Bouwers | 350—20 |
| 3,152,214 | 10/1964 | Korones et al. | 350—199 |
| 3,212,420 | 10/1965 | De la Cierva | 95—12.5 |
| 3,424,522 | 1/1969 | Call | 350—16 XR |

NORTON ANSHER, Primary Examiner

R. L. MOSES, Assistant Examiner

U.S. Cl. X.R.

95—12.5; 355—16, 20, 31